United States Patent
Staake et al.

(10) Patent No.: US 11,231,103 B2
(45) Date of Patent: Jan. 25, 2022

(54) LUBRICANT SUPPLY FOR AN ELECTRIC DRIVE SYSTEM AND MOTOR VEHICLE WITH SUCH A LUBRICANT SUPPLY

(71) Applicant: Bayerische Motoren Werke Aktiengesellschaft, Munich (DE)

(72) Inventors: Michael Staake, Munich (DE); Richard Baeumler, Munich (DE); Nikola Brk, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 490 days.

(21) Appl. No.: 16/221,786

(22) Filed: Dec. 17, 2018

(65) Prior Publication Data
US 2019/0120369 A1 Apr. 25, 2019

Related U.S. Application Data

(63) Continuation of application No. PCT/EP2017/063071, filed on May 30, 2017.

(30) Foreign Application Priority Data

Jun. 23, 2016 (DE) .................. 10 2016 211 226.0

(51) Int. Cl.
F16H 57/04 (2010.01)

(52) U.S. Cl.
CPC ....... *F16H 57/0441* (2013.01); *F16H 57/045* (2013.01); *F16H 57/0476* (2013.01); *F16H 57/043* (2013.01); *F16H 57/0417* (2013.01)

(58) Field of Classification Search
CPC ............... F16H 57/0441; F16H 57/045; F16H 57/0476; F16H 57/0417; F16H 57/043
See application file for complete search history.

(56) References Cited

U.S. PATENT DOCUMENTS

| 4,418,777 A | 12/1983 | Stockton |
| 5,217,085 A | 6/1993 | Barrie et al. |

(Continued)

FOREIGN PATENT DOCUMENTS

| CN | 104169616 A | 11/2014 |
| CN | 204628525 U | 9/2015 |

(Continued)

OTHER PUBLICATIONS

International Search Report (PCT/ISA/210) issued in PCT Application No. PCT/EP2017/063071 dated Aug. 8, 2017 with English translation (five (5) pages).

(Continued)

*Primary Examiner* — Michael A Riegelman
(74) *Attorney, Agent, or Firm* — Crowell & Moring LLP

(57) ABSTRACT

A lubricant supply for a powertrain in an electrically driven motor vehicle has a hydraulic oil pump, which can be driven by a drive actuator, a lubricant supply point and a lubricant reservoir. The hydraulic oil pump can generate a first lubricant volume flow from the lubricant reservoir to the lubricant supply point and a second lubricant flow volume from the lubricant supply point or an additional lubricant supply point in the lubricant reservoir. The drive actuator is an electric motor. The lubricant supply point is arranged in a traction motor with a rotor shaft and a motor housing. The additional lubricant supply location is disposed in a traction transmission. The lubricant supply points can be supplied with lubricant by way of the first lubricant volume flow.

13 Claims, 1 Drawing Sheet

(56) References Cited

U.S. PATENT DOCUMENTS

| | | | | |
|---|---|---|---|---|
| 8,909,402 | B2* | 12/2014 | Miyamoto | F16H 61/0021 |
| | | | | 701/22 |
| 2010/0320849 | A1* | 12/2010 | Wilton | H02K 7/116 |
| | | | | 310/52 |
| 2014/0331639 | A1* | 11/2014 | Raimarckers | F01M 1/12 |
| | | | | 60/39.08 |
| 2015/0051768 | A1* | 2/2015 | Miyamoto | B60W 30/1843 |
| | | | | 701/22 |
| 2015/0057858 | A1* | 2/2015 | Nitta | F16H 57/0439 |
| | | | | 701/22 |
| 2017/0191551 | A1* | 7/2017 | Staake | F16H 3/66 |
| 2019/0120369 | A1* | 4/2019 | Staake | F16H 57/045 |
| 2021/0006132 | A1* | 1/2021 | Steinz | F16H 57/0476 |

FOREIGN PATENT DOCUMENTS

| | | |
|---|---|---|
| CN | 204716945 U | 10/2015 |
| DE | 100 34 400 A1 | 1/2002 |
| DE | 10 2014 205 881 B3 | 6/2015 |
| JP | 2001-190047 A | 7/2001 |
| JP | 2006-312353 A | 11/2006 |
| JP | 2012-127456 A | 7/2012 |
| WO | WO 2013/136163 A1 | 9/2013 |

OTHER PUBLICATIONS

German-language Written Opinion (PCT/ISA/237) issued in PCT Application No. PCT/EP2017/063071 dated Aug. 8, 2017 (seven (7) pages).

German-language Office Action issued in counterpart German Application No. 10 2016 211 226.0 dated Feb. 1, 2017 (six (6) pages).

Chinese-language Office Action issued in Chinese Application No. 201780020329.6 dated Oct. 30, 2020 with English translation (16 pages).

* cited by examiner

LUBRICANT SUPPLY FOR AN ELECTRIC DRIVE SYSTEM AND MOTOR VEHICLE WITH SUCH A LUBRICANT SUPPLY

CROSS REFERENCE TO RELATED APPLICATIONS

This application is a continuation of PCT International Application No. PCT/EP2017/063071, filed May 30, 2017, which claims priority under 35 U.S.C. § 119 from German Patent Application No. 10 2016 211 226.0, filed Jun. 23, 2016, the entire disclosures of which are herein expressly incorporated by reference.

BACKGROUND AND SUMMARY OF THE INVENTION

The invention relates to a lubricant supply for a drive train in an electrically driven motor vehicle. A lubricant supply for a motor vehicle is known in general from DE 100 34 400 A1.

Components of the drive train, such as the traction motor, that is to say the motor for providing the drive power for overcoming the driving resistances, or a traction transmission, that is to say a transmission for adapting the drive power, which is provided by the traction motor, to the driving resistances, are lubricated and cooled in motor vehicles. It is a general aim here to provide the lubricating/cooling functionality by way of means which are as simple as possible, but also with great efficiency.

DE 100 34 400 A1 proposes what is known as a dry sump lubrication system having two pumps which are coupled mechanically to one another to form a double pump, and of which one is configured as a scavenge pump and the other is configured as a pressurized oil pump.

It is an object of the present invention to provide a structurally compact but efficient lubricant supply for an electrically driven motor vehicle. This and other objects are achieved by way of a lubricant supply and by way of a motor vehicle having a lubricant supply of this type, in accordance with embodiments of the invention.

Both the traction motor and the traction transmission can preferably be supplied with lubricant or lubricating oil by way of the same pressurized oil pump, that is to say by way of a common lubricant supply.

Within the context of the invention, a lubricant supply is to be understood to mean a system which supplies lubricating oil, or lubricant, to drive components, in particular an electric drive motor (what is known as a traction motor) and a transmission for the transmission of drive power which can be output by the traction motor (what is known as a traction transmission).

Here, in this context, lubricant is to be understood to mean a fluid which can be used, in particular, to reduce the friction of and/or cool the respective components of the drive system, preferably a mineral oil or a fully or partially synthetic lubricant. Further preferably, lubricant is also to be understood to mean an emulsion which consists at least partially of water and preferably a polyglycol.

Within the context of the invention, a drive train is to be understood to mean a device for providing and transmitting drive power (traction power) for overcoming driving resistances, in particular acceleration resistance, gradient resistance, rolling resistance and air resistance, in a motor vehicle, in particular a passenger motor vehicle. A drive train of this type preferably has a traction motor of this type, in particular an electromechanical energy converter, or an electric motor/generator, and a traction transmission of this type.

Within the context of the invention, an electrically driven motor vehicle is to be understood to mean a vehicle, in particular a passenger motor vehicle, which can be driven at least partially, preferably completely, by way of the electromechanical traction motor. A motor vehicle of this type is preferably to be understood to mean what is known as a battery electric vehicle (BEV) or a hybrid vehicle, that is to say a vehicle with both an internal combustion engine drive and an electric drive.

Within the context of the invention, a lubricant supply point is to be understood to mean a geometric location or region in the drive train of the electrically driven motor vehicle, which location or region can be supplied according to plan by way of the lubricant supply with lubricant for cooling and/or lubricating said location or region. A lubricant supply point of this type is preferably to be understood to mean a rotor or a stator of the traction motor; further preferably, a bearing point for a shaft, in particular the rotor shaft of the traction motor or preferably a transmission shaft of the traction transmission. A lubricant supply point is preferably to be understood to mean a region for the transmission of the drive power in the traction transmission, in particular a toothing region of gearwheels which are set up in said transmission for the transmission of the drive power.

Within the context of the invention, a lubricating oil pump or pressurized oil pump is to be understood to mean a device for supplying two lubricant supply points with lubricant. A pump of this type is preferably set up for the production of a first and preferably a second lubricant volumetric flow, and, to this end, the lubricating oil pump preferably has a first pump (with regard to the first volumetric flow) and a second pump (with regard to the second volumetric flow), and is thus preferably configured as a double pump.

A double pump of this type preferably has a common drive actuator, by way of which drive power for the production of the first and second lubricant volumetric flow can be fed to the double pump. Further preferably, drive power from the traction motor of the motor vehicle for the production of the volumetric flow or flows can be fed to the lubricating oil pump.

The first pump of the lubricating oil pump is preferably configured as a pressurized oil pump, and the second pump is preferably configured as a scavenge pump. Further preferably, the scavenge pump and the pressurized oil pump, or a pump shaft of the scavenge pump and a pump shaft of the pressurized oil pump, are arranged concentrically or preferably coaxially, that is to say in an axially parallel and radially spaced apart manner, with respect to one another.

A pump shaft of this type is, in particular, that shaft, by which drive power for the production of the lubricant volumetric flow can be fed to the pump. In a double pump of this type, the scavenge pump and the pressurized oil pump are preferably arranged in a common housing; a common housing of this type can preferably have a dividing plane between the scavenge pump and the pressurized oil pump.

Within the context of the invention, a lubricant reservoir is to be understood to mean a collecting region, in which the lubricant which is applied for use in the lubricant supply can be collected at least partially and can therefore be stored. The lubricant reservoir is preferably to be understood to mean an oil pan or an oil tank. The lubricant reservoir is preferably set up such that the lubricant can be stored in it in the short term, with the result that air can preferably escape from the lubricant or, further preferably, particles can be deposited.

Within the context of the invention, a lubricant volumetric flow is to be understood to mean a volumetric flow of the lubricant in the lubricant supply. A first lubricant volumetric flow can preferably be produced by means of the pressurized oil pump from the lubricant reservoir to at least one of the lubricant supply points. A second lubricant volumetric flow can preferably be produced by means of the scavenge pump from the lubricant supply point, or a collecting region, in which lubricant which comes from one or more of the lubricant supply points is collected. Further preferably, the second lubricant volumetric flow is produced as a return flow into the lubricant reservoir. This return flow is preferably formed automatically on the basis of an action of gravity.

Within the context of the invention, a common drive actuator is to be understood to mean a drive actuator which is set up to provide pump drive power, both for the scavenge pump and for the pressurized oil pump. In other words, drive power for producing the first and second lubricant volumetric flows can be fed both to the pressurized oil pump and the scavenge pump via a single common drive actuator. This common drive actuator is preferably configured as an electromechanical energy converter, in particular as an electric motor.

The lubricant volumetric flow (second lubricant volumetric flow) which can be produced by way of the scavenge pump is preferably greater than the lubricant volumetric flow (first lubricant volumetric flow) which can be produced at the same time during operation as planned by way of the pressurized oil pump. Here, the first and the second lubricant volumetric flows which can be produced are to be determined, in particular, at the same time.

Within the context of the invention, a cooling jacket of the traction motor is to be understood to mean a recess in the region of a motor housing of the traction motor, which recess is set up for the guidance of a lubricant volumetric flow. Here, the recess, by way of which the cooling jacket is formed, is preferably arranged completely in a motor housing of the traction motor. The lubricant volumetric flow which is fed to the cooling jacket is preferably the complete first lubricant volumetric flow or a part volumetric flow which is branched off therefrom. Temperature control of the traction motor is made possible, in particular, by means of a cooling jacket, without the lubricant coming into contact with the rotor shaft of the traction motor in the process. Lubricant in the abovementioned region of the traction motor can cause losses and, in particular, an efficient possibility for controlling the temperature of the traction motor can therefore be provided by way of a cooling jacket.

Within the context of the invention, the lubricant volumetric flow which can be produced is to be understood to mean that volumetric flow of lubricant which can be produced, in particular, at the drive speed which can be predetermined by way of the common drive actuator. Accordingly, the volumetric flow or lubricant volumetric flow which can be produced is a volumetric flow which can be achieved theoretically. In particular, the lubricant volumetric flow which can be produced can be determined in nominal operation, that is to say when the pump sucks in lubricant which is free from gas or air or other contaminants. In the case of the scavenge pump, in particular, it can occur during operation as planned that the actually provided lubricant volumetric flow is lower than the lubricant volumetric flow which can be produced, since the scavenge pump sucks in "air", or a lubricant which is permeated with air bubbles. A division of this type of the volumetric flows makes it possible that generally speaking more lubricant can be delivered into the lubricant reservoir than out of the latter, and particularly reliable operation of the lubricant supply is thus made possible. An operating principle of this type is known from the prior art of dry sump lubrication systems.

In one preferred embodiment of the invention, a transmission is arranged, in relation to the transmission of power from the scavenge pump to the pressurized oil pump, between said pumps. Further preferably, said transmission is configured in such a way that the drive speed of the scavenge pump in operation as planned of the lubricant supply is greater than the drive speed of the pressurized oil pump. A difference of this type in the drive speeds at the two pumps is produced, in particular, when the two pumps are driven, in particular, by means of the common drive actuator and, in relation to the transmission of power from one of said pumps to the other, a transmission is arranged between them. In particular, a ratio of the drive speeds between the two pumps can be predetermined by means of a transmission of this type. This transmission is preferably configured as a planetary transmission, and with preference as a spur gear transmission with transmission shafts which are axially parallel and preferably spaced apart radially. In particular, a configuration of this type makes it possible that the volumetric flow which can be produced by the scavenge pump, in particular on account of the greater drive speed in comparison with the pressurized oil pump, is greater than the volumetric flow which can be produced by the pressurized oil pump, and, in particular, a particularly simple construction of the lubricant supply is thus made possible, even if the pressurized oil pump and the scavenge pump are otherwise structurally identical.

In one preferred embodiment of the invention, a lubricant delivery volume per revolution of a drive shaft is greater in the case of the scavenge pump than in the case of the pressurized oil pump. A drive shaft of this type is to be interpreted as a pump shaft, that is to say as that shaft of the pump, to which the drive power can be transmitted in order to produce the lubricant volumetric flow. The scavenge pump and the pressurized oil pump can preferably be coupled kinematically in an immediate or direct manner, with the result that the pump shaft of the scavenge pump and of the pressurized oil pump have the same rotational speed. Further preferably, the pump shaft of the scavenge pump and of the pressurized oil pump can be connected fixedly to one another so as to rotate together, and are preferably configured in one piece with one another. A particularly space-saving construction of the double pump and therefore of the lubricant supply can be achieved, in particular, by a construction of this type.

In one preferred embodiment of the invention, the scavenge pump and the pressurized oil pump in each case have a pump rotor which is mounted rotatably and can be driven in order to produce the respective lubricant volumetric flow. One of the pumps or both pumps is/are preferably configured as a gear pump. Further preferably, the pump rotors or at least the pump shafts are arranged concentrically with respect to one another. A mechanically particularly simple construction of the double pump can be achieved, in particular, by a concentric orientation.

In one preferred embodiment of the invention, the first or the second lubricant volumetric flow or both lubricant volumetric flows is/are guided through a heat exchanger. Here, a heat exchanger is to be understood to mean a device, to which said lubricant volumetric flow can be fed on one side and a further cooling volumetric flow can be fed on the other side, with the result that thermal energy can be dissipated from the lubricant volumetric flow. The heat exchanger is preferably configured as an air heat exchanger, with the result that the cooling volumetric flow is an air flow. The heat exchanger is with preference configured as a liquid heat exchanger, to which a liquid volumetric flow can be fed as a cooling volumetric flow, preferably from a motor vehicle cooling system. By way of an air heat exchanger, in particular, a particularly simple and operationally reliable construction is made possible, and a particularly high cooling performance can be achieved, in particular, by way of a liquid heat exchanger, with the result that a compact construction can be achieved by way of a system of this type.

In one preferred embodiment of the invention, the above-mentioned heat exchanger can be bypassed by way of a bypass or what is known as a bypass line. A bypass valve is preferably provided for controlling said bypass. Here, the control of the bypass is to be understood to mean the control or regulation, in particular, of the first lubricant volumetric flow, or a part volumetric flow thereof which can be conducted past the heat exchanger, and a further part volumetric flow which can be conducted through the heat exchanger. In particular, a bypass valve makes it possible to influence the temperature and/or the pressure level in the lubricant supply.

Whereas all components of the drive train are as a rule frequently sufficiently cool in the starting phase, in particular a cold starting phase, of the motor vehicle, it can occur in continuous operation that individual components are excessively warm and thus the drive power is reduced, in particular in order to avoid damage. The above-described bypass line, in particular, makes it possible to conduct the first lubricant volumetric flow as required through the heat exchanger; for example, in a first (early) operating phase (cold starting phase), the first lubricant volumetric flow is preferably conducted through the bypass line and the heat exchanger or preferably at least partially or completely through the bypass line, it being possible for a low flow resistance to be achieved in this way and efficient operation being made possible. In a second (later) operating phase, the first lubricant volumetric flow is conducted through the heat exchanger or is preferably guided to a lesser extent through the bypass line, and therefore the drive train is cooled.

In one preferred embodiment of the invention, the further lubricant supply point is arranged in a traction transmission of the electrically driven motor vehicle. Here, in this context, a traction transmission is to be understood to mean a transmission, preferably a shiftable gear transmission or with preference an axle drive, by which drive power which can be provided by the traction motor in order to overcome driving resistances can be transmitted. A lubricant collecting region is preferably arranged in the traction transmission. Here, in this context, a collecting region of this type is to be understood to mean a location, at which lubricant collects, and/or from which said lubricant can be extracted by means of the scavenge pump from the lubricant supply point in the direction of the lubricant reservoir. Accordingly, in particular, the second lubricant volumetric flow can be discharged from the lubricant collecting region to the scavenge pump, and/or to the lubricant reservoir. Friction occurs, in particular, in the traction transmission on account of the transmission of power, which friction can be reduced by way of the first lubricant volumetric flow or preferably a part volumetric flow thereof.

In one preferred embodiment of the invention, the lubricant supply point is arranged in the electric traction motor of the electrically driven motor vehicle. One lubricant supply point is preferably provided in the traction motor and a further lubricant supply point is provided in the traction transmission. A part volumetric flow from the first lubricant volumetric flow can preferably be fed in each case to the lubricant supply point (traction motor) and the further lubricant supply point (traction transmission) or preferably to at least one of said lubricant supply points. The traction motor and/or the traction transmission can be supplied with lubricant from a single lubricant volumetric flow which can preferably be produced by a single pressurized oil pump, in particular by means of an embodiment of this type.

In one preferred embodiment of the invention, the traction motor has a rotor shaft for providing the drive power for the motor vehicle. Preferably the first lubricant volumetric flow or with preference a part volumetric flow thereof can be fed by way of the rotor shaft to the traction motor and therefore to the lubricant supply point which is arranged therein. The first lubricant volumetric flow can preferably be conducted at least partially through said rotor shaft.

The traction motor has a motor housing which is stationary with respect to the rotor shaft. The lubricant collecting region or one of the lubricant collecting regions is preferably arranged in said motor housing. The second lubricant volumetric flow can preferably be discharged from said lubricant collecting region or one of said lubricant collecting regions to the scavenge pump, or is extracted therefrom by the scavenge pump. The maximum drive power which can be output by the traction motor can be increased, in particular, by way of the temperature control of the traction motor, in particular in the region of the rotor shaft.

In one preferred embodiment, the lubricant reservoir has an overflow line, it being possible for excessive lubricant which is conveyed into said reservoir to flow out from the latter in a targeted manner by way of said overflow line. The overflow line is preferably set up to establish a fluid-conducting connection between the lubricant reservoir and at least one of the lubricant supply points. Uncontrolled discharge of lubricant can be prevented, in particular, by means of an overflow line of this type, for example in the case of the failure of the pressurized oil pump, and a certain lubricant supply of at least one of the lubricant supply points can be achieved, furthermore.

In one preferred embodiment of the invention, an air separator is provided in the second lubricant volumetric flow downstream of the scavenge pump. Here, an air separator is to be understood to mean a device, by which air or gas which is absorbed in the lubricant is removed partially or preferably completely therefrom. A cyclone air separator is preferably provided. Air separators per se are known from the prior art.

A lubricant supply according to the invention can advantageously be used in an electrically driven motor vehicle, which results in an electrically driven motor vehicle having a lubricant supply of this type.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
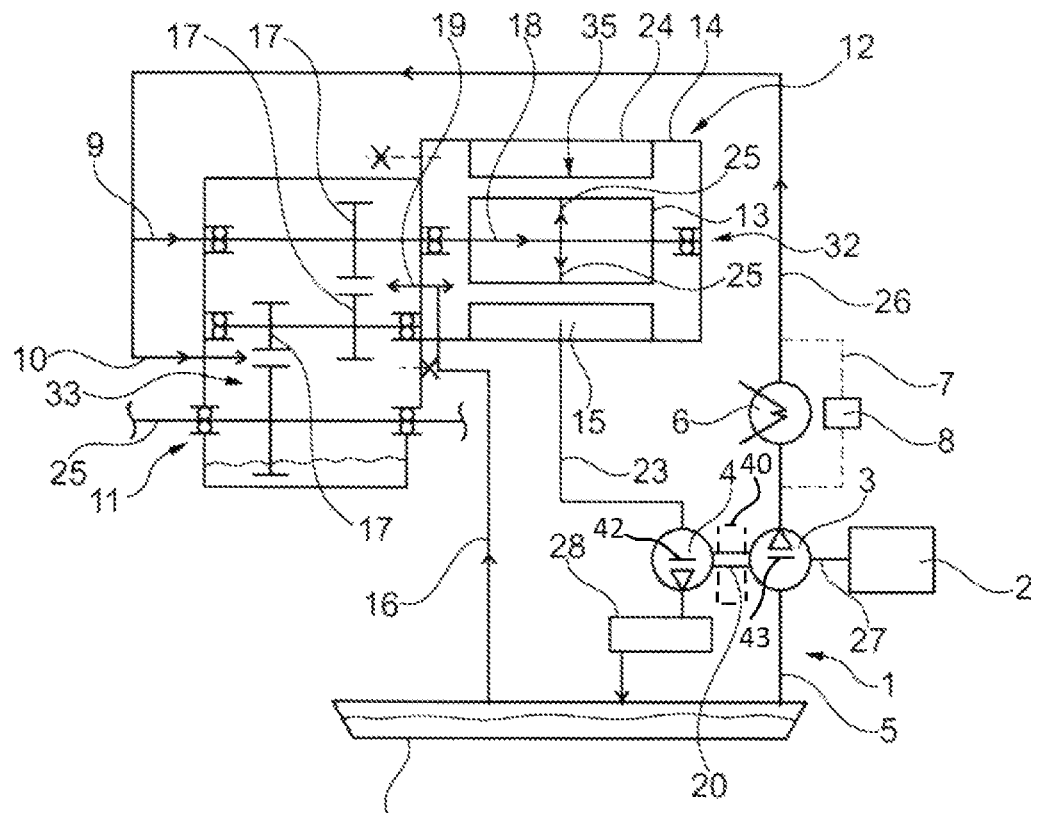
FIG. 1 is a diagrammatic lubricating supply having a double pump.

FIG. 1 shows a diagrammatic lubricant supply. The lubricant supply has a double pump 1. The double pump 1 has a pressurized oil pump 3 and a scavenge pump 4. The pressurized oil pump 3 and the scavenge pump 4 are connected to one another fixedly via the connecting shaft 20 so as to rotate together. Here, the drive power which is provided by the common drive actuator, which is configured as an electric motor 2, is transmitted by way of the common drive shaft 27 to the pressurized oil pump 3 and from the latter via the connecting shaft 20 to the scavenge pump 4. The two pumps 3, 4 are therefore driven by way of a common drive actuator.

The pressurized oil pump 3 sucks lubricant via the suction line 5 from the lubricant reservoir which is configured as an oil tank 21, in order to produce a first lubricant volumetric flow. The first lubricant volumetric flow is fed to the lubricant supply points 32, 33 via the pressurized oil line 26 which is divided into the part lines 9, 10.

A heat exchanger 6 is provided in the pressurized oil line 26. The throughflow through the heat exchanger 6 can be influenced by the valve 8 and the bypass line 7.

Here, as an alternative to the embodiment which is shown, the valve 8 can also be arranged in the pressurized oil line 26, with the result that the throughflow through the heat exchanger 6 can be shut off completely and the entire volumetric flow can be conducted through the bypass line 7. A configuration of this type is possible independently of the remaining configuration of the lubricant supply.

The first part line 9 opens into a bore 18 which is made in the rotor 13 of the traction motor 12. Both the rotor 13, the stator 24, and the motor housing 14 of the traction motor 12 can be supplied with lubricant by way of the outlet recesses 25 which can open into the air gap 35. A collecting region 15 for lubricant which flows back is provided in the stator 24 and/or in the motor housing 14.

A second lubricant volumetric flow is produced via the suction line 23 by way of the scavenge pump 4, by which second lubricant volumetric flow the lubricant flows back out of the collecting region 15 via the air separator 28 into the oil tank 21.

Lubricant can be fed via the second part line 10 to the further lubricant supply point 33 in the traction transmission 11, with the result that the gearwheels 17 can be supplied with lubricant.

The oil tank 21 has an overflow line 16, by means of which a fluid-conducting connection is established between the oil tank and the traction motor 12 or the traction transmission 11 via the oil outlets 19.

For the transmission of power, the traction transmission 11 has a series of gearwheels 17. The gearwheels 17 form the further lubricant supply point 33 in the traction transmission 11. The drive power which can be provided by the traction motor 12 is transmitted by way of the traction transmission 11 to the output shaft 25 and can be transmitted from the latter to a drive axle.

Figure 2:
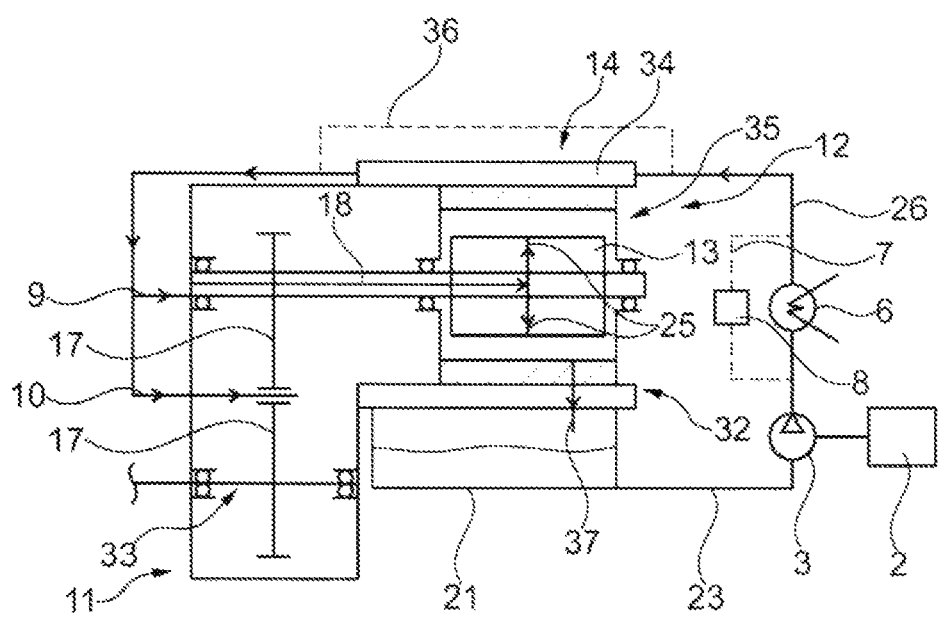
FIG. 2 is a diagrammatic lubricating supply having a single pressurized oil pump.

FIG. 2 shows a diagrammatic illustration of a further lubricant supply. Here, the pressurized oil pump 3 which is driven by the electric motor 2 sucks lubricant directly via the suction line 23 out of the oil tank 21. The arrangement in relation to the heat exchanger 6, and the bypass line 7 and the bypass valve 8 are embodied as shown in FIG. 1.

The traction motor 12 has a motor housing 14. A cooling jacket 34 is arranged in the motor housing 14. In a first variant, the cooling jacket 34 can be flowed through by the lubricant volumetric flow. A second variant provides that the cooling jacket 34 cannot be flowed through by lubricant, but rather by another cooling fluid, for example water. For the second variant, the lubricant volumetric flow is guided around the traction motor 12 by way of the hydraulic line 36.

The lubricant can be conducted to the lubricant supply point 32 and the further lubricant supply point 33 by way of the first and second part lines 9, 10. From the first part line 9, the part volumetric flow passes through the bore 18 into the rotor 13 of the traction motor 12. Through the second part line 10, the second part volumetric flow passes to the gearwheels 17 in the traction transmission 11 and therefore to the further lubricant supply point 33.

Via the return line 37, the lubricant passes back into the oil tank 21. A delivery action for the lubricant in the direction of the return line 37 results in the traction transmission 11 by way of the gearwheels 17.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lubricant supply for a drive train in an electrically driven motor vehicle, comprising:
   a lubricating oil pump configured as a double pump comprising a scavenge pump and a pressurized oil pump, which are drivable commonly by way of an electric motor drive actuator and are couplable to a common drive shaft of the electric motor drive actuator for drive purposes,
   a first lubricant supply point arranged in a traction motor having a rotor shaft and a motor housing;
   a further lubricant supply point arranged in a traction transmission; and
   a lubricant reservoir, wherein
   a first lubricant volumetric flow from the lubricant reservoir to the first and further lubricant supply points is producible by the pressurized oil pump,
   a second lubricant volumetric flow from at least one of the first or further lubricant supply points into the lubricant reservoir is producible by the scavenge pump, and
   the second lubricant volumetric flow which is producible is greater than the first lubricant volumetric flow which is producible.

2. The lubricant supply as claimed in claim 1, wherein the first or the second lubricant volumetric flow is guided through a heat exchanger.

3. The lubricant supply as claimed in claim 2, wherein the heat exchanger is bypassable by way of a bypass, and a bypass valve is provided in order to control said bypass.

4. The lubricant supply as claimed in claim 1, further comprising:
   a transmission arranged between the pressurized oil pump and the scavenge pump for transmitting power from the pressurized oil pump to the scavenge pump, wherein said transmission is configured such that a drive speed of the scavenge pump in operation as planned of the double pump is greater than a drive speed of the pressurized oil pump.

5. The lubricant supply as claimed in claim 1, wherein lubricant delivery volume per revolution of the common drive shaft is greater in the case of the scavenge pump than in the case of the pressurized oil pump.

6. The lubricant supply as claimed in claim 5, wherein the scavenge pump and the pressurized oil pump in each case have a pump rotor which is rotatable in order to produce the respective lubricant volumetric flow, and said pump rotors are arranged concentrically with respect to one another.

7. The lubricant supply as claimed in claim 1, wherein a lubricant collecting region is arranged in the traction transmission, and the second lubricant volumetric flow is dischargeable from said lubricant collecting region to the scavenge pump.

8. The lubricant supply as claimed in claim 1, wherein the first and further lubricant supply points are suppliable in each case with a part volumetric flow from the first lubricant volumetric flow.

9. The lubricant supply as claimed in claim 1, wherein lubricant from the first lubricant volumetric flow is feedable to the traction motor by way of the rotor shaft, a lubricant collecting region is arranged in the motor housing, and the second lubricant volumetric flow is dischargeable from said lubricant collecting region to the scavenge pump.

10. The lubricant supply as claimed in claim 1, wherein the traction motor has a stator, the stator is temperature controllable by way of a cooling jacket in the motor housing, and lubricant from the first lubricant volumetric flow is feedable to the cooling jacket.

11. The lubricant supply as claimed in claim 1, wherein the lubricant reservoir has an overflow line, and the overflow line is set up to establish a fluid-conducting connection between the lubricant reservoir and one of the first and further lubricant supply points.

12. The lubricant supply as claimed in claim 1, further comprising:
an air separator in the second lubricant volumetric flow downstream of the scavenge pump.

13. An electrically driven motor vehicle comprising the lubricant supply as claimed in claim 1.

* * * * *